United States Patent
Tsuji et al.

(10) Patent No.: US 7,320,839 B2
(45) Date of Patent: Jan. 22, 2008

(54) POLYMER ELECTROLYTE FUEL CELL AND CONDUCTIVE SEPARATOR FOR THE SAME

(75) Inventors: Yoichiro Tsuji, Osaka (JP); Yoshihiro Hori, Nara (JP); Masaki Yamauchi, Osaka (JP); Makoto Uchida, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 615 days.

(21) Appl. No.: 10/823,796

(22) Filed: Apr. 14, 2004

(65) Prior Publication Data

US 2004/0258974 A1 Dec. 23, 2004

(30) Foreign Application Priority Data

Apr. 14, 2003 (JP) .............................. 2003-108881

(51) Int. Cl.
*H01M 2/00* (2006.01)
*H01M 2/08* (2006.01)

(52) U.S. Cl. .......................................... 429/34; 429/35

(58) Field of Classification Search ............... 429/35, 429/36, 34
See application file for complete search history.

(56) References Cited

U.S. PATENT DOCUMENTS

| | | | |
|---|---|---|---|
| 5,798,188 A | 8/1998 | Mukohyama et al. | |
| 6,291,094 B1 | 9/2001 | Yoshimura et al. | |
| 6,472,094 B1 | 10/2002 | Nonoyama et al. | |
| 6,490,778 B1 | 12/2002 | Funatsu et al. | |
| 6,531,245 B2 | 3/2003 | Mizuno et al. | |
| 6,660,419 B1 | 12/2003 | Nishida et al. | |
| 6,670,066 B2 | 12/2003 | Tsuji et al. | |
| 6,699,593 B2 | 3/2004 | Kaneta et al. | |
| 6,926,983 B2 | 8/2005 | Brambilla et al. | |
| 7,070,876 B2 * | 7/2006 | Artibise et al. | 429/34 |
| 2002/0004082 A1 | 1/2002 | Saito et al. | |
| 2002/0187384 A1* | 12/2002 | Kato et al. | 429/35 |
| 2003/0072986 A1 | 4/2003 | Kusakabe et al. | |
| 2003/0143451 A1 | 7/2003 | Andou et al. | |
| 2003/0143452 A1 | 7/2003 | Ito et al. | |
| 2004/0041294 A1 | 3/2004 | Horiuchi et al. | |
| 2004/0058223 A1 | 3/2004 | Shibata et al. | |
| 2004/0058249 A1 | 3/2004 | Cal et al. | |

FOREIGN PATENT DOCUMENTS

| | | |
|---|---|---|
| CN | 1402892 A | 3/2003 |
| EP | 1 289 042 A2 | 3/2003 |
| JP | 08-148170 * | 6/1996 |
| JP | 2000-348741 | 12/2000 |
| JP | P2001-351651 | 12/2001 |
| JP | P2002-329504 | 11/2002 |

* cited by examiner

*Primary Examiner*—Patrick Joseph Ryan
*Assistant Examiner*—Thomas H. Parsons
(74) *Attorney, Agent, or Firm*—McDermott Will & Emery LLP

(57) ABSTRACT

A fuel cell is disclosed having a separator that can minimize damage to a membrane electrode assembly. The separator advantageously has a groove therein approximately positioned over an outer edge of an electrode of the fuel cell to reduce any pressure between the separator and the outer edge of the electrode upon assembly and during use thereafter.

12 Claims, 4 Drawing Sheets

POLYMER ELECTROLYTE FUEL CELL AND CONDUCTIVE SEPARATOR FOR THE SAME

FIELD OF THE INVENTION

The present invention relates to a fuel cell, and more particularly, to a polymer electrolyte fuel cell having an improved separator.

BACKGROUND

A polymer electrolyte fuel cell typically includes an anode and cathode electrode sandwiching a polymer membrane that selectively transports ions between the electrodes. The electrodes typically include a catalyst layer and a gas diffusion layer. The polymer membrane in combination with the anode and cathode electrodes is commonly refered to as a Membrane Electrode Assembly (MEA).

A general configuration of this fuel cell is shown in FIG. 1. As shown, a pair of catalyst layers 2 sandwich polymer electrolyte membrane 1. The electrodes are typically composed of a metal catalyst such as platinum supported by carbon and the polymer electrolyte membrane is used to selectively transport hydrogen ions from one catalyst layer to another. A polymer electrolyte membrane that can transport hydrogen ions is typically composed of a fluorinated polymer containing sulfonic acid groups. A pair of gas diffusion layers 3, which are gas permeable and conduct electricity, are positioned over the outer surfaces of catalyst layers 2. In this structure, electrode 4 is composed of gas diffusion layer 3 and catalyst layer 2. A gas diffusion layer is usually made up of a porous carbon based material, which includes carbon powder and fluorinated resin. Carbon paper, cloth sheet, felt, etc. are generally used as the support for the porous diffusion layer. Separator 6 is typically electrically conductive and mechanically fixes electrodes 4 on either face of polymer electrode membrane 1. Separator 6 additionally contains gas channels 7, which are located on its surfaces so that they face the electrodes and can be used to supply reaction gases to the electrodes and to remove excess gas and waste gas generated by the electrochemical reaction.

The gas channels are generally formed by creating a groove on the separator surfaces, although it is possible to detach them from the separators. A cooling water channel 8 can be created on the other surface of the separator to circulate water to maintain the cell's temperature. Gas is supplied to the gas channel on each separator from a manifold which can be internal or external to the separators. The outlet from the gas channel is also connected to a manifold which carries away the waste water and excess gas.

To prevent the fuel and oxidant that are supplied to the electrodes from leaking to the outside of the cell and from mixing with each other, gaskets 5 are provided around the edge of electrodes 4. A gasket is typically made of an O-ring, a rubber sheet, or a sheet composed of an elastic resin and rigid resin. The gas seals and gaskets are integrated with the electrodes and polymer membrane and are typically assembled in advance. At least one electrically conductive separator is placed between adjacent MEA's to electrically connect the MEA's in series with each other, and to provide mechanical support. In a fuel cell structure, MEA's, separators and cooling sections are aligned in alternating layers to form a stack of 10-200 cells, and the ends of the stack are sandwiched with current collector plates and electrical insulating plates and the entire unit is secured with a fastening rod.

Electrolyte membranes used for this type of fuel cells are very thin and are easily damaged, however. For example, they may be damaged by the cross section of the gasket. To address this potential damage, new shapes for the cross section of the gasket have been proposed. For example, Japanese Patent Application No. 2001-351651 discloses a variety of shapes for a gasket which contacts the electrode in the fuel cell as a means to address damage to the polymer electrolyte membrane. Japanese Patent Application No. 2002-329504 addresses the damage to an electrolyte membrane by inserting a frame-shaped seal between the membrane and an electrode.

The gas diffusion layer placed on a catalyst layer can easily damage the electrolyte membranes as well because the layers are often not cleanly cut when manufactured and therefore the edges of the layers may have pointed protruding carbon fibers as a result of such incomplete cuts. If the base of the layer is made of thin carbon paper, the edges of the layer would have numerous minute cracks, and these cracks are one of the main causes of damage to the electrolyte membrane. Once the electrolyte membrane is damaged, a direct short circuit and/or gas leak may occur at the damaged area. This aggravates damage to the fuel cell further.

Accordingly, a continuing need exists to provide a durable electrolyte membrane electrode assembly that is easily assembled without damage to the membrane.

SUMMARY OF THE DISCLOSURE

An advantage of the present invention is a fuel cell that has a separator that can minimize damage to cell components upon assembly or during operation.

According to the present invention, the foregoing and other advantages are achieved in part by a fuel cell separator that can minimize damage to a membrane upon assembly. The separator advantageously has a groove therein approximately positioned over an outer edge of an electrode of a fuel cell to reduce any pressure between the separator and the outer edge of the electrode upon assembly thereby minimizing any damage the electrode or layer thereof may inflict on the underlying membrane.

In an embodiment of the present invention, a fuel cell comprises an electrolyte membrane, a pair of electrodes sandwiching the polymer electrolyte membrane, an anode side separator contacting least one of the electrodes, and a cathode side separator contacting the other electrode. Advantageously, at least one of the separators has a groove therein approximately over an edge of at least one of the pair of electrodes.

Another aspect of the present invention includes a method for the assembly of a fuel cell. The method comprises sandwiching a pair of electrodes, each composed of a catalyst layer and gas diffusion layer, with a polymer electrolyte membrane; and sandwiching a pair of separators on either electrode by applying a lower pressure at the edges of the gas diffusion layer and a higher pressure at the center of the gas diffusion layer. Advantageously, at least one of the pair of separators has a groove therein approximately positioned over an outer edge of the pair of electrodes. This groove can reduce any pressure that may otherwise (i.e. without the groove) be present during the assembly of the unit cells and thus minimizes membrane damage due to any roughened edges of the electrode layers.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

The various features and advantages of the present invention will become more apparent and facilitated by reference to the accompanying drawings, submitted for purposes of illustration and not to limit the scope of the invention, where the same numerals represent like structure and wherein.

DETAILED DESCRIPTION OF THE DISCLOSURE

Figure 1:
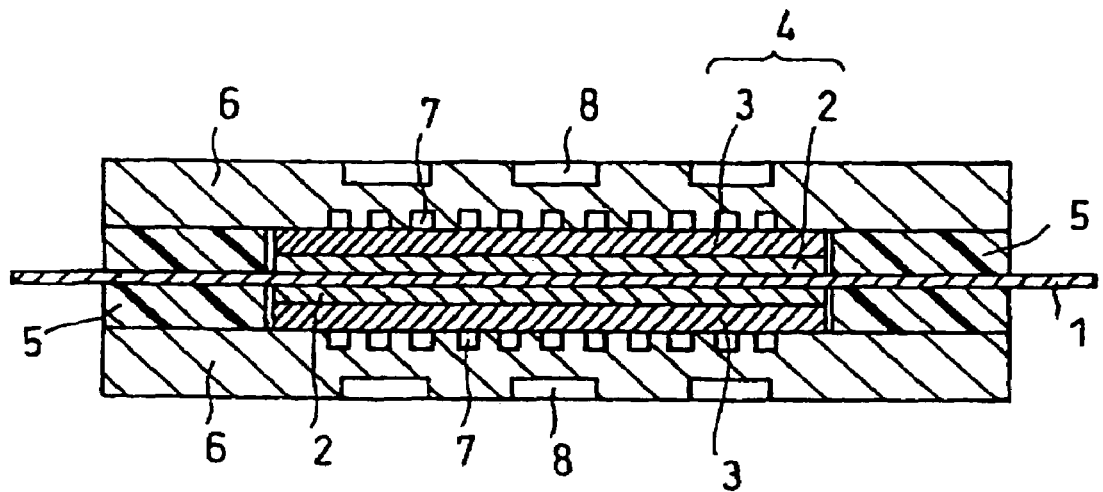
FIG. 1 is the cross section view showing a representative construction of a polymer electrolyte fuel cell.

The present invention addresses the resulting damage of fuel cells during convention manufacture thereof. In particular, the present inventors discovered that by minimizing the pressure on the outer edge of an electrode, which is typically composed of a catalyst layer and a gas diffusion layer, damage to the polymer membrane can potentially be reduced. In one aspect of the present invention, a separator is provided for contacting an electrode of a fuel cell, which has a groove therein that is located approximately over an outer edge of an electrode to which the separator is to be in contact. The separator groove acts to potentially reduce pressure on the outer edge the electrode during and after assembly thereby reducing the likelihood that any roughened edges of the electrode or a layer thereof would damage the underlying membrane.

In an embodiment of the present invention, a fuel cell comprises: a polymer electrolyte membrane, a pair of electrodes composed of a catalyst layer and a gas diffusion layer sandwiching the membrane, an anode side conductive separator plate contacting an electrode with gas channels to supply fuel gas to the electrode, a cathode side conductive separator plate contacting the other electrode with gas channels to supply oxidant gas to the other electrode, wherein at least one of the separators has a groove that meets an edge of the electrode or a layer thereof.

The groove can be of any depth and dimension. In a preferred embodiment, the depth of the groove of the separator is approximately 80% to 120% of the thickness difference between an electrode (or a layer thereof or thereon) in its non-compressed and compressed state. The compressed thickness is that which can be approximated and expected after the fuel cell is assembled. The compression results from the pressure applied to MEAs to fasten the fuel cell. The thickness difference can be calculated by comparing the thickness of the particular electrode or layer first in its non-compressed state and then to its expected compressed state, e.g. as expected after assembly of the unit cells in a fuel cell stack. This is the thickness difference of the non-compressed and compressed layer. It is preferable that the layer being compared be in contact with the separator, i.e. an electrode in intimate contact with the separator, a layer thereof or a layer thereon. In one aspect of the present invention, the depth of the groove of the separator is approximately 80% to 120% of the thickness difference of the diffusion layer on the electrode.

In one aspect of the present invention, the separator includes a gas channel connected to an inlet manifold and an outlet manifold. Preferably, the groove in the separator is isolated from the gas channel and the manifolds so that no gas will readily flow into the groove during the operation of the fuel cell.

For sealing construction of the fuel cell, it is possible to arrange a gasket outside of the separators' groove. On the other hand, it is also possible to arrange the gasket inside of the separators' groove. In this case, material similar to gasket, such as a fluorinated resin or prepolymer thereof, should be substituted for a section of the gas diffusion layer. Such materials include polytertrafluoroethylene, fluoroethylene-propylene copolymer or their prepolymeric components. Also the gasket should be in contact with the substituted portion of the gas diffusion layer.

The electrodes and membrane are often compressed together before sandwiching the MEA with the separators during the manufacturing process of the cell stack. This invention contemplates and describes methods that allows the MEAs to be compressed together with little pressure around the edges of the electrode or any layer thereof or thereon. In one aspect of the present invention, a method is provided which reduces potential damage to a polymer membrane. The method is summarized by sandwiching a polymer electrolyte membrane with a pair of electrodes composed of a catalyst layer and a gas diffusion layer. At this step, it is preferable that the pressure at the edges is lower than the pressure at the center of the gas diffusion layer. As the second step, a pair of conductive separators is placed so that they sandwich the unified membrane.

In one aspect of the inventive fuel cell design, one or both of the separators have a groove at a place that meets the edges of the gas diffusion layers. This reduces or stops the pressure of the separators on the edges of the gas diffusion layers. The edges of the gas diffusion layers often have minute projections that may harm the electrolyte membranes. This invention will lessen the likelihood of this damage happening.

Figure 2:
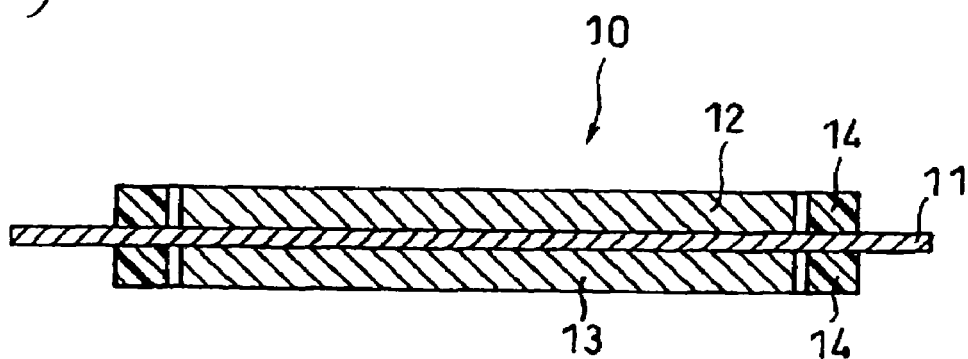
FIG. 2 is the cross section view showing the MEA of the fuel cells used in an experiment in accordance with an embodiment of the present invention.
Figure 3:
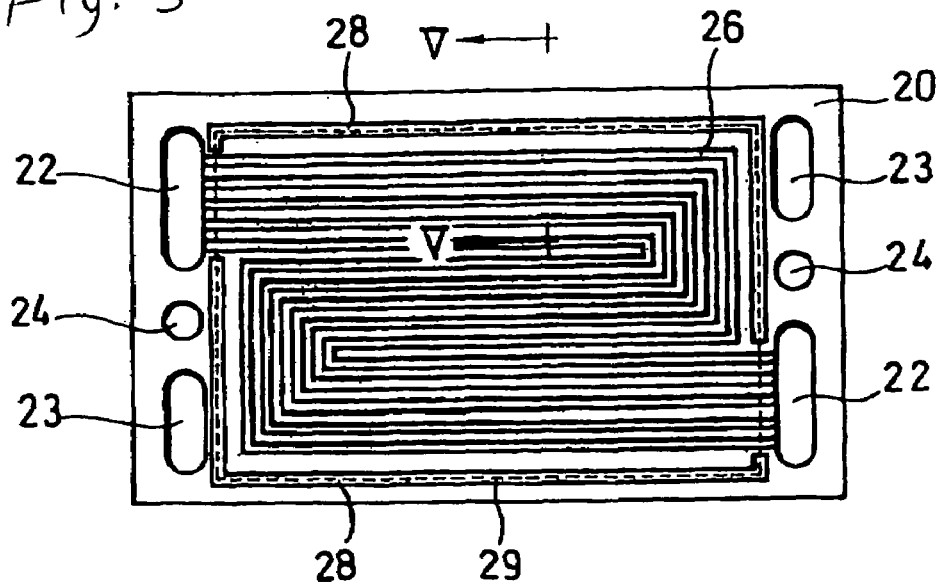
FIG. 3 is the front view showing a cathode separator in accordance with an embodiment of the present invention.
Figure 4:
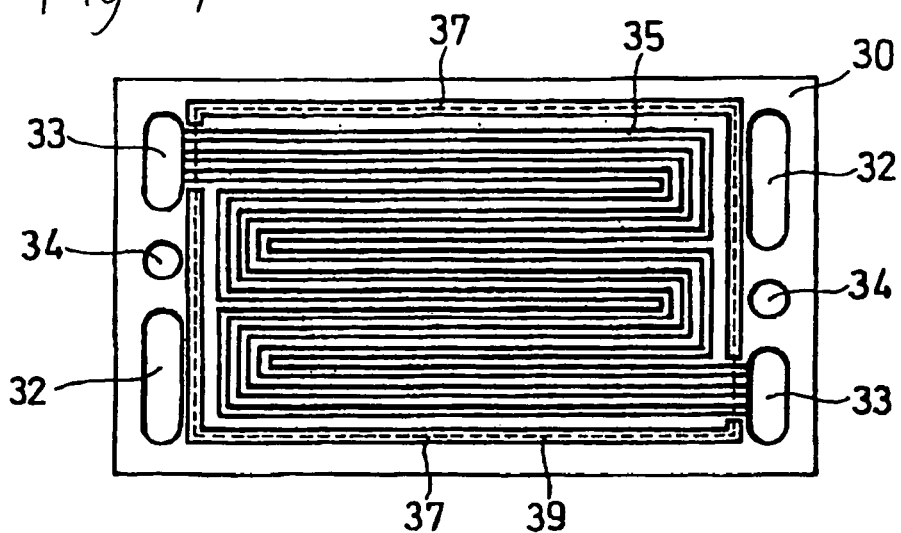
FIG. 4 is the front view showing the anode in accordance with an embodiment of the present invention.
Figure 5:
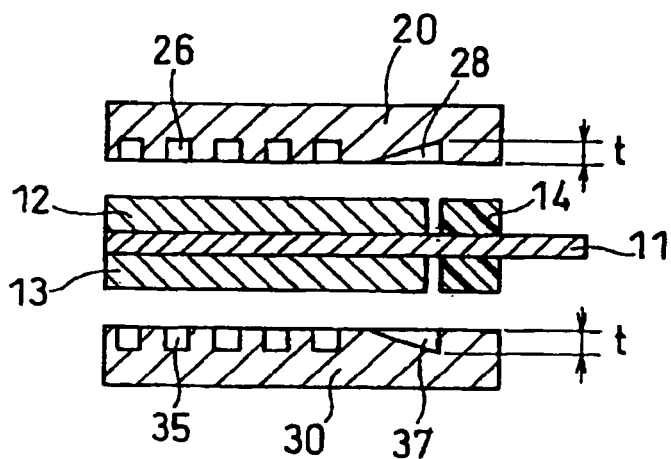
FIG. 5 is the v-v cross section of FIG. 3 of polymer electrolyte fuel cell in accordance with an embodiment of the present invention.

The invention will be explained in further detail with reference to the following figures which show and facilitate the understanding of certain embodiments of the present invention and are not to be interpreted as limiting the inventive concept disclosed herein. For example, FIG. 2 shows a cross section of MEA 10, which comprises a polymer electrolyte membrane 11, a cathode electrode 12 and an anode electrode 13. These electrodes sandwich MEA 10. A pair of gaskets 14 arranged along the edges of the electrodes is also shown. FIG. 3 is the front view of the cathode side separator, and FIG. 4 is the front view of the anode side separator. FIG. 5 is the cross sectional view of the MEA 10, the cathode side separator 20 and the anode side separator 30 that sandwich the MEA 10 cross-section at the v-v line shown in FIG. 3.

As shown in the figures, the cathode side separator 20 has a pair of oxidant gas manifold holes 22, a pair of fuel gas manifold holes 23, a pair of cooling water manifold holes 24 and gas channels 26 to connect the oxidant gas manifold holes to each other. In the cathode side separator 20, grooves 28 are formed. The location of the grooves approximately correspond to the edges of the gas diffusion layer of the cathode electrode. The portion surrounded by dotted lines 29 is where the edges of the gas diffusion layer come into contact with the separator. The groove 28 is not formed at the place where the gas channels 26 connect to the manifold holes.

Similarly, the anode side separator 30 has a pair of oxidant gas manifold holes 32, a pair of fuel gas manifold holes 33, a pair of cooling water manifold holes 34 and gas channels 35 to connect the fuel gas manifold holes each other. In the anode side separator 30, grooves 37 are formed at approximate places that face the edges of the gas diffusion layer of the anode electrode. The edges of the gas diffusion layer face the portion surround by dotted lines 39 in the figure. The grooves 37 are not formed at the place where the gas channels 35 connect to the manifold holes. Thus, grooves 37 are substantially isolated from the supply of reactant gases.

In the embodiment shown in FIG. 5, the grooves 28 and 37 gradually become shallower as they approach the center of the electrode. In this example, at least one of the separators placed next to the edges of the electrode has these grooves. The depth (t) of the groove at the portion that is in contact with the edges of the gas diffusion layer is preferably 80% to 120% of the decreased thickness of the gas diffusion layer after the layers are compressed and fastened as stacked cells. If the depth of the groove is shallower than the preferable thickness, the effect to reduce damage to the electrolyte membrane lessens because the edges of the gas diffusion layer may be overly compressed. If the depth of the groove is deeper than the preferable thickness, the separators need to be fortified (e.g. thickened) to maintain the strength of the separator. Increasing the depth would not change the fact that there is little to no pressure at the edges, however.

Figure 6:
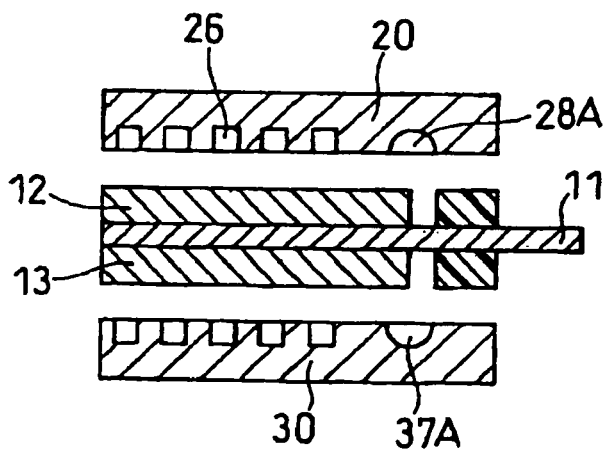
FIG. 6 is the cross section view showing the main parts of the polymer electrolyte fuel cell in accordance with an embodiment of the present invention.
Figure 7:
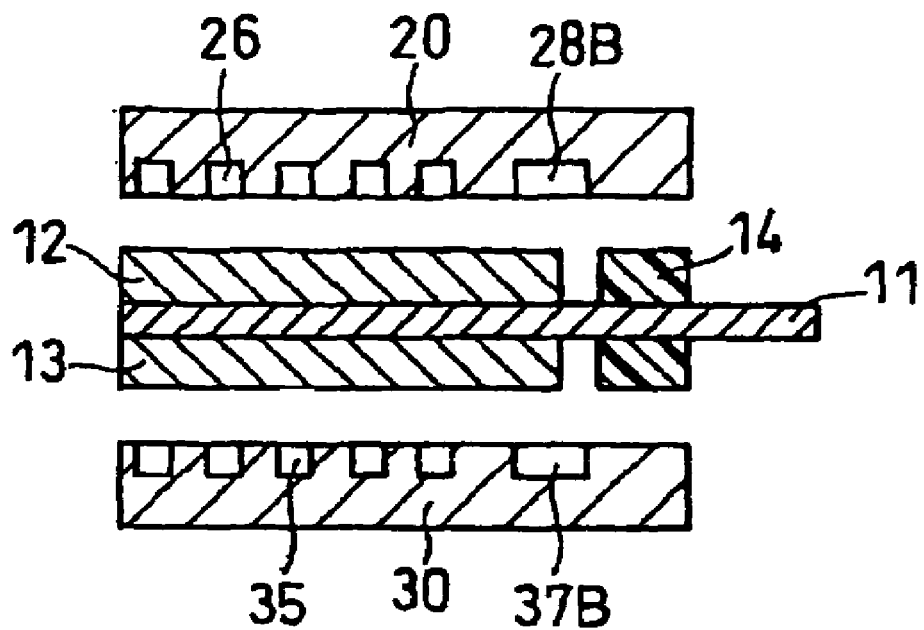
FIG. 7 is the cross section view showing the main parts of the polymer electrolyte fuel cell in accordance with an embodiment of the present invention.

The shape of the groove can vary as shown in FIGS. 5 to 7. FIG. 6 shows a cell that has grooves 28A and 37A in the shape of a semi-circle from a cross section view. FIG. 7 shows a sample of a cell with box-shaped grooves 28B and 37B from a cross section view. The shapes of the grooves are not limited to these examples. Any shape of groove can be used. Preferably, the shape restrains the pressure at the edge of the gas diffusion layer. If the groove has the shape as shown in FIG. 5, the damage to the electrolyte membrane and gas diffusion layer by the edges of the groove can be restrained since the pressure is gradually reduced at the end of the groove.

In practicing certain embodiments of the present invention, the anode side separator and cathode side separator of the fuel cell are unified through a gasket to prevent gas leakage. There are at least two ways to combine the grooves of the separator and the gasket. One is where the gasket is arranged outside of the grooves, and another is where the gasket is arranged inside the grooves. In the case where the gasket is arranged outside of the grooves, gas that is supposed to flow into the gas channels can also flow into the grooves. In the event gas flows into the groove, the gas does not contribute to the reaction. Nevertheless, while there are no problems with air tightness. However, in the case where grooves are too deep and there exists a gap between the gas diffusion layer and the groove of the separator, the effect might be less desirable.

If the grooves are formed at a position where the gas flows into the gas channels from the manifold holes, gas will flow into the grooves. Therefore, in the case where the gasket is arranged outside the grooves, it is possible to prevent gas leakage by not forming the grooves at that position. In this case, high pressure is added to the edge of the gas diffusion layer. However, a ratio of the length of the portion receiving the pressure to the total length of the edges is very small, and therefore, damage to the electrolyte membrane can be easily restrained. Furthermore, it is possible not to form the groove at the places other than where the channels are located. It is possible to restrain not only the direct short cuts of gas from the gas inlets to the gas outlets, but also the direct short cut of gas from the end of the gas zigzag channel to the other end of the gas zigzag channels by not forming the groove such places.

Figure 8:
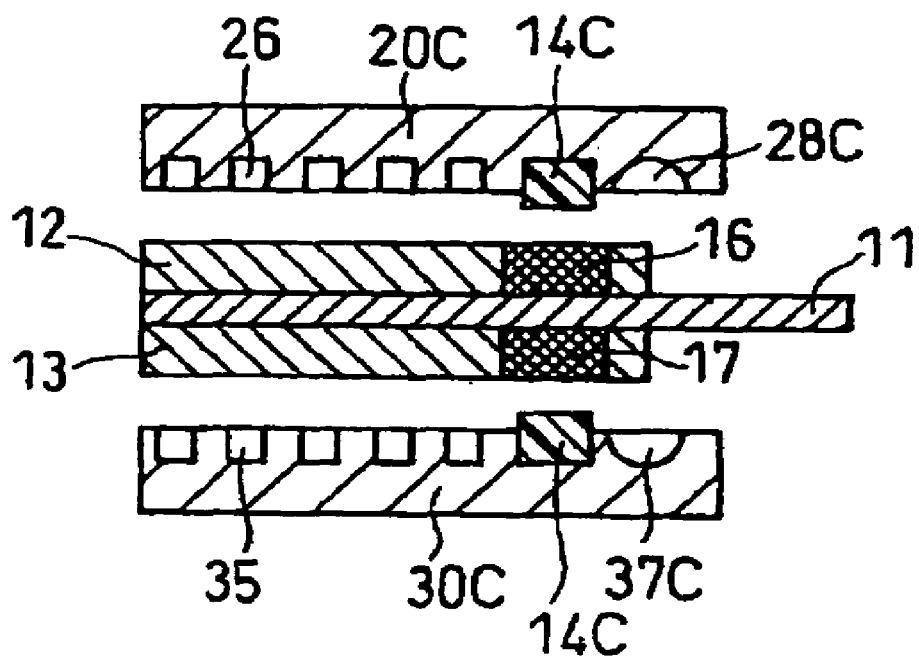
FIG. 8 another cross section view showing the main parts of the polymer electrolyte fuel cell in accordance with an embodiment of the present invention.

On the other hand, in the case where the gasket is arranged inside the grooves, the gasket may contact the gas diffusion layer directly, which may be of concern since the gas diffusion layer is intended to allow gas to pass through it and the contact of the gasket may not be sufficient to seal this area sufficiently for efficient operation of the cell. Under certain circumstances, the contact area between the gasket and the gas diffusion layer may not be completely sealed and certain additional precaution may be warranted. To address this issue, it is preferable to have a gas sealing material substituted for that potion of the gas diffusion layer that contacts the gasket. Such materials gas sealing materials can be substituted for the gas diffusion layer, they can be polymerized in-place by soaking prepolymeric materials into the gas diffusion layer, etc. FIG. 8 shows a gas sealing material substituted for portions 16 and 17 of the cathode electrode 12 and the anode electrode 13 respectively. For the material, fluorine resin like polytetrafluoroethylene or fluoroethylene-propylene compound, or flourabinylidene, fluora-rubber, silicone rubber, etc. should be used.

Further, it is in general that many assemblies that unifies an electrolyte membrane, a catalyst layer and a gas diffusion layer in advance, are stacked with separators and gaskets. In this step, damage to the electrolyte layer can easily occur if any pressure is applied to the edges of the gas diffusion layer. Therefore, it is preferable not to add much pressure to the edges of the gas diffusion layer when assembling the MEAs. The present invention contemplates assembling MEAs with reduced pressure applied at the edges of the electrode or layers thereof.

Figure 9:
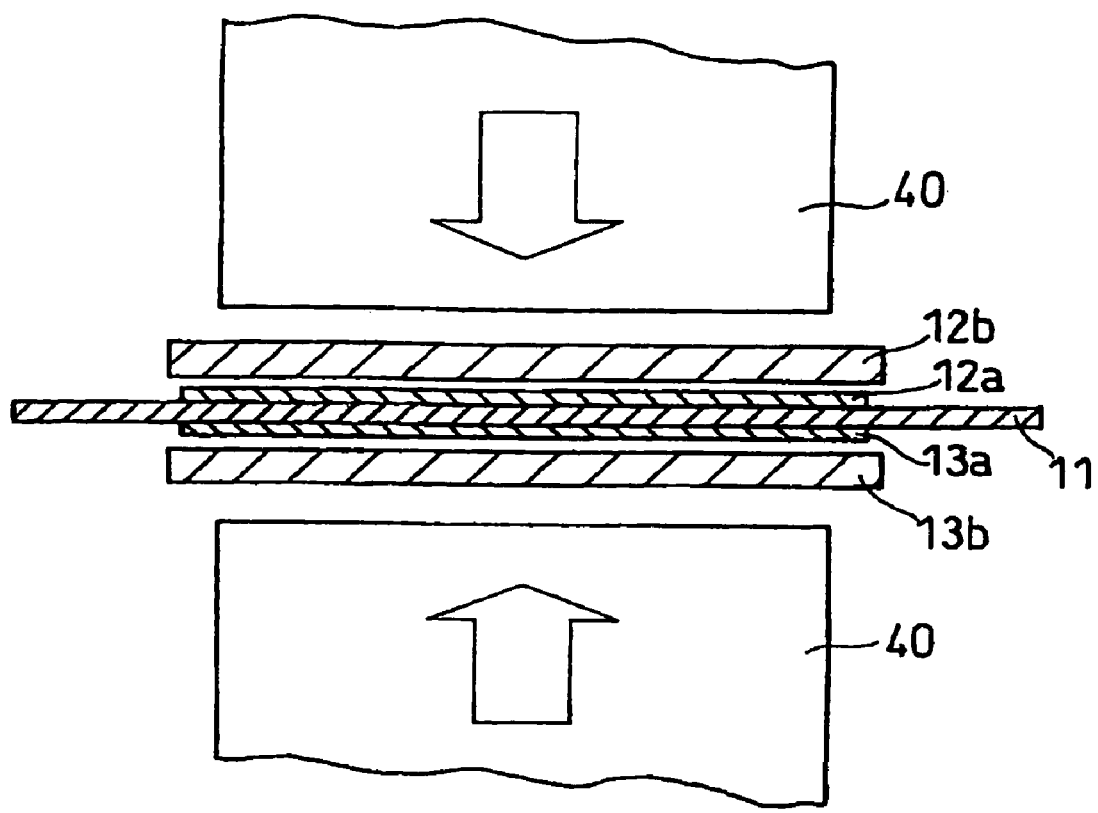
FIG. 9 is the cross section view showing the unifying process of an MEA in one aspect of the present invention.

For example, as shown in FIG. 9, during the process of contacting a hot press plate on the stacked electrolyte membranes 11, catalyst layers 12a and 13a and gas diffusion layers 12b and 13b, the compressed portion of the gas diffusion layer should be arranged inside the edges of the gas diffusion layer. In one aspect, the gas diffusion layer should be slightly bigger than the press plate 40. If the edges of the gas diffusion layer are placed around 3 to 5 mm outside the press 40, damage to the electrolyte membrane is restrained.

EXAMPLES

The following examples describe the manufacturing of fuel cells in more detail. These examples are intended to further illustrate certain preferred embodiments of the invention and are not limiting in nature. Those skilled in the art will recognize, or be able to ascertain, using no more than routine experimentation, numerous equivalents to the specific substances and procedures described herein.

Experiment 1

First, the following describes the manufacturing method of an MEA.

About 15 wt % of an aqueous dispersion of polytetrafluoroethylene (PTFE) was added as dry weights to acetylene-black (Denka-black manufactured by Denka Kagaku Kougyou Kabushiki Kaisha) to make waterproof ink. These products were diffused in a colloid mill for 30 minutes while being mixed together. Then, the ink was painted on one side of a 300 μm carbon paper, and treated in a dryer set at 150° C. Then, it was heated for 2 hours at 350° C. to create gas diffuse layer. The amount of paint used was about 5 mg per 1 cm². The end-result was cut into specified size.

Catalyst layers were formed on both sides of a polymer electrolyte membrane (Nafion 112 of DuPont). These catalyst layers were composed of 70 weight percent of a compound made from equal amounts of conductive carbon power (Lion Inc.'s Ketchen-black EC ??) and platinum catalyst, and 30 weight percentage of electrolyte used in the above mentioned electrolyte membranes. The gas diffusion layer was added on top of the electrolyte membranes' catalyst layers. Then, these layers were combined under 1 MPa of pressure for 5 minutes in 100° C. to form the MEA. For this compression, the size of the press plates used was 8 mm shorter in length than the length of the gas diffusion layer, as similarly shown in FIG. 9. The plates were made shorter so that they would not come in contact with the edges of the gas diffusion layers.

The depth of the grooves on the separators were compared.

The structure of the cells was the same as that shown in FIG. 5. Also, there were grooves in the gas channels that run from the manifold holes to the reactive parts. The gas diffusion layers used here had thickness of 380 μm to 300 μm from the carbon paper and 80 μm from the water proofed layer. After compressing the layer at 1 MPa, the same as the pressure used to compress fuel cells, the thickness of the layer was reduced to about 330 μm. This was a reduction of about 50 μm of the initial, uncompressed, thickness of the gas diffusion layer. The thickness 's' of the gas diffusion layer was estimated to be 330 μm. Then, the depth of the grooves was varied and the characteristics of the fuel cells were examined. Several separator plates having a groove with a depth, t, equal to about 30, 40, 50, 60 or 80 μm were compared. Also, a plate without a groove (t=0) was made for comparison purposes.

After sandwiching the MEA with a pair of gaskets made from fluorine rubber (Dupont dow-elastomer Japan VITON GBL), the separators were placed on either side of the gaskets to create a fuel cell unit. The product was evaluated under a condition where heated pure hydrogen gas was supplied to make the anode's dew point at 65° C., and heated air was supplied to make the cathode's dew point at 70° C. Also the temperature of the cell was maintained at 70° C. The fuel gas usage efficiency was at about 70%, and the air usage efficiency was at about 40 or 70%.

Ten cells of each specification were made, and the characteristics of each sample cell is shown in the table below, which provides the average values of the ten cells. Table 1 shows the value of depth (t) of the groove; the percentage (t/s) of the depth (t) to the thickness difference (s) between the gas diffuse layer in its non-compressed and compressed state; the initial voltage of the open circuit; and the percentage of voltage at 70% of air usage efficiency as compared to 40% of air usage efficiency (hereinafter referred to as air usage characteristics) at 0.2 A/cm². The thickness difference between the non-compressed and compressed gas diffusion layer was estimated to be about 50 μm for the following measurements.

TABLE 1

| | (s is about 50 μm) | | |
|---|---|---|---|
| Depth t (μm) | t/s (%) | Open Circuit Voltage (mV) | Voltage Comparison (%) |
| 0 | 0 | 883 | 98.2 |
| 30 | 60 | 903 | 98.1 |
| 40 | 80 | 956 | 98.2 |
| 50 | 100 | 960 | 97.8 |
| 60 | 120 | 963 | 96.2 |
| 80 | 160 | 963 | 89.1 |

The table shows that the best results for the open circuit voltage and air usage characteristics were obtained when the depth of the grooves were at about 40 to 60 μm (i.e. t/s was about 80% to about 120%). However, when the grooves were shallower, the membranes were partially damaged by the pressure of the edges of the layers, which resulted in a lower open circuit voltage. It was also observed that if the open circuit voltage is lower than 950 mV, the current flowing through any short-circuit through the membrane is increased, which accelerated a decline of efficiency of electrical generation and/or lowered the quality of the membrane because of the partial generation of heat. Furthermore, it was observed that when the grooves were deeper, the actual amount of gas flow decreases and the air usage characterstics decreased. This was believed to occur due to gas flowing through the groves. In addition, the capability of cell to discharge generated waste water decreases because the pressure of gas which flows through the gas channels decreases. When the voltage comparison is lower than 95%, a sharp voltage drop is seen because of the unstable gas supply. Under worse circumstances, the voltage reaches a minimum threshold voltage halting the system. Therefore, the best characteristics were observed in these embodiments when t/s is equal to about 80% to about 120%.

Table 2 and 3 show additional results of experiments of operating a fuel cell when the thickness difference between the gas diffusion layer in its non-compressed and compressed states are 30 μm and 80 μm respectively.

TABLE 2

| | (s = 30 μm) | | |
|---|---|---|---|
| Depth t (μm) | t/s (%) | Open Circuit Voltage (mV) | Voltage Comparison (%) |
| 0 | 0 | 892 | 99.1 |
| 10 | 33 | 912 | 98.9 |
| 25 | 83 | 960 | 98.8 |
| 30 | 100 | 965 | 98.5 |

TABLE 2-continued (s = 30 μm)

| Depth t (μm) | t/s (%) | Open Circuit Voltage (mV) | Voltage Comparison (%) |
|---|---|---|---|
| 35 | 117 | 965 | 98.0 |
| 40 | 133 | 066 | 91.2 |

TABLE 3

(s = 80 μm)

| Depth t (μm) | t/s (%) | Open Circuit Voltage (mV) | Voltage Comparison (%) |
|---|---|---|---|
| 0 | 0 | 863 | 98.0 |
| 50 | 63 | 892 | 98.0 |
| 65 | 81 | 950 | 97.8 |
| 80 | 100 | 963 | 97.2 |
| 95 | 119 | 965 | 95.5 |
| 110 | 138 | 965 | 90.3 |

The gas diffusion layer used in the experiments resulting in the data for Table 2 had an uncompressed thickness of 280 μm. The gas diffusion layer was prepared in the same manner described for experiment 1, except using a carbon paper support having a thickness of 200 μm with waterproof layer of about 80 μm. After fastening the unit cell having the gas diffusion layer on an electrode thereof with a pressure of about 1 MPa, the compressed thickness of the gas diffusion layer was about 250 μm. Thus the thickness difference (s) was about 30 μm. For the results provided in Table 3 (s=80 μm), a gas diffusing layer having a non-compressed thickness of 380 μm was used. The fastening pressure of the cell was about 1.5 MPa resulting in a compressed thickness for the gas diffusion layer of about 300 μm. Both tables show that good characteristic are achieved when t/s is 80% 120%. Therefore, it is found that even when the thickness of the gas diffusion layer is varied and the groove depth is varied, the fuel cell system shows very similar characteristics when t/s is 80% to 120%.

Experiment 2

Next, under the conditions of example 1 where t=60 μm, another evaluation of the fuel cell was carried out by using separators that do not have grooves for gas to travel from the manifold to the reactive parts as shown in FIG. 3 and FIG. 4. All other conditions use the same as the conditions in experiment 1. As a result, the open circuit voltage changed from 963 mV to 962 mV, which is a minor change. Also, the air usage efficiency increased from 96.2% to 97.9%. This shows the benefits of restraining gas from flowing into the grooves.

Experiment 3

As shown in FIG. 8, this experiment examines a structure where the gasket is placed inside the grooves. The depth of the grooves were 60 μm. Extra grooves on the separators were made for the gaskets. The thickness of gaskets was determined so that the gaskets were 100 μm longer than the sides of the separators. Apart from the changes in shapes of the separators and the gaskets, all conditions were exactly the same as experiment 1. As a result, the open circuit voltage was at 960 mV; however, the air usage efficiency degraded to 95.3%. This is most likely because the gas leaked through the gas diffusion layers.

Next, fluorine rubber was added to the areas where the gas diffusion layers and gaskets met, minimizing the likelihood of gas leakage. Then, a similar experiment was carried out and the results showed that the air usage efficiency increased to 98.0%.

Experiment 4

This experiment examined the unifying process of the membrane, electrodes and the gas diffusion layers. In experiment 1, the size of the press plates were about 8 mm smaller in both width and height as compared to the gas diffusion layers so that the press plates did not come into contact with the edges of the gas diffusion layers. In this experiment, the press plates were made to be larger than the gas diffusion layers. The unifying process was the same as experiment 1, that is, about 1 MPa of pressure was applied with the press plates at 100° C. for 5 minutes.

The cells used were the same as experiment 1 (the depth of the grooves in the separators was 60 μm in this experiment 4). As a result, the open circuit voltage decreased from 963 mV to 931 mV. Therefore, reducing pressure along the edges of the gas diffusion layers lead to less damage to the membranes and also to an increase in open circuit voltage.

Although the insides volume of the grooves are ample in the above experiments, it is possible to fill the grooves with material which absorb the pressure added to the gas diffusion layer. For example, material like sponge or rubber would be used to fill the groove so that an opening between the gads diffusion layer and the separator at the groove would be effectively cancelled, and gas flowing into the groove would be restrained. As explained above, the present invention can improve the efficiency of a fuel cell by preventing or minimizing damage to the polymer electrolyte membrane by small pieces projected from edges of a gas diffusion layer.

Only the preferred embodiment of the present invention and examples of its versatility are shown and described in the present disclosure. It is to be understood that the present invention is capable of use in various other combinations and environments and is capable of changes or modifications within the scope of the inventive concept as expressed herein. Thus, for example, those skilled in the art will recognize, or be able to ascertain, using no more than routine experimentation, numerous equivalents to the specific substances, procedures and arrangements described herein. Such equivalents are considered to be within the scope of this invention, and are covered by the following claims.

What is claimed is:

1. A fuel cell comprising:
   a polymer electrolyte membrane,
   a pair of electrodes sandwiching the polymer electrolyte membrane,
   an anode side separator with gas channels to supply fuel to at least one of the electrodes, and
   a cathode side separator with gas channels to supply oxidant to the other electrode,
   wherein at least one of the separators has a groove over an edge of at least one of the pair of electrodes,
   the depth of the groove is about 80% to about 120% of the compressed thickness difference of the electrode or a layer thereof or a layer thereon in contact with the separator, and the compressed thickness difference is defined under the pressure of 1 MPa.

2. A separator for contacting an electrode of a fuel cell having a groove therein that is isolated from any gas channel and approximately positioned over an outer edge of an electrode of a fuel cell.

3. A method of manufacturing a fuel cell, the method comprising:
sandwiching a pair of electrodes, each composed of a catalyst layer and gas diffusion layer, with a polymer electrolyte membrane, and
sandwiching a pair of separators on either electrode by applying lower pressure at the edges of the gas diffusion layer and higher pressure at the center of the gas diffusion layer,
wherein at least one of the separators has a groove over an edge of at least one of the pair of electrodes, the depth of the groove is about 80% to about 120% of the compressed thickness difference of the electrode or a layer thereof or a layer thereon in contact with the separator, and the compressed thickness difference is defined under the pressure of 1 MPa.

4. A fuel cell comprising:
a polymer electrolyte membrane,
a pair of electrodes sandwiching the polymer electrolyte membrane,
an anode side separator with gas channels to supply fuel to at least one of the electrodes, and
a cathode side separator with gas channels to supply oxidant to the other electrode,
wherein at least one of the separators has a groove to form a hollow space over an edge of at least one of the pair of electrodes, and the groove is isolated from the gas channels.

5. The fuel cell according to claim 1 or 4, wherein the at least one of the pair of electrodes comprises a catalyst layer contacting the polymer electrolyte membrane and a gas diffusion layer over the catalyst layer.

6. The fuel cell according to claim 5, wherein the groove of the separator is at a position where the gas channel intersects with the gas diffusion layer so that the groove is not connected to the gas channels.

7. The fuel cell according to claim 4, wherein the depth of the groove is about 80% to about 120% of the compressed thickness difference of the electrode or a layer thereof or a layer thereon in contact with the separator, and the compressed thickness difference is defined under the pressure of 1 MPa.

8. The fuel cell according to claim 1 or 4, wherein a gasket is arranged outside the groove of the separator.

9. The fuel cell according to claim 1 or 4, wherein a gasket is arranged inside the groove of the separator.

10. The fuel cell according to claim 9, wherein the gasket contacts the gas diffusion layer where the gas diffusion layer has a substituted gas sealing material.

11. A method of manufacturing a fuel cell, the method comprising:
sandwiching a pair of electrodes, each composed of a catalyst layer and gas diffusion layer, with a polymer electrolyte membrane, and
sandwiching a pair of separators on either electrode by applying lower pressure at the edges of the gas diffusion layer and higher pressure at the center of the gas diffusion layer,
wherein at least one of the separators has a groove to form a hollow space over an edge of at least one of the pair of electrodes, and the groove is isolated from the gas channels.

12. The method of claim 3 or 11, wherein at least one of the pair of separators has a groove therein approximately positioned over an outer edge of the pair of electrodes.

* * * * *